United States Patent [19]
Lindsey

[11] 4,052,663
[45] Oct. 4, 1977

[54] TIMING SYSTEM FOR MEASURING ANGLE OF ADVANCE OF FUEL INJECTION

[75] Inventor: Alfred L. Lindsey, Annapolis, Md.

[73] Assignee: Honeywell Inc., Minneapolis, Minn.

[21] Appl. No.: 695,912

[22] Filed: June 14, 1976

Related U.S. Application Data

[63] Continuation of Ser. No. 513,248, Oct. 9, 1974, abandoned.

[51] Int. Cl.$^2$ ............... G01R 13/42; G01R 23/00; G01R 29/00
[52] U.S. Cl. ................... 324/16 R; 324/15; 324/16 T; 73/119 A
[58] Field of Search ............. 73/119, 119 A, 120; 324/16 R, 16 T, 15

[56] References Cited

U.S. PATENT DOCUMENTS

| 3,454,871 | 7/1969 | Nolting | 324/16 T |
| 3,511,088 | 5/1970 | Weaver | 73/119 A |
| 3,731,527 | 5/1973 | Weaver | 73/119 A |
| 3,753,108 | 8/1973 | Eberle | 324/16 T |
| 3,767,902 | 10/1973 | Estes et al. | 324/16 R |
| 3,916,683 | 11/1975 | Felger et al. | 73/119 A |

FOREIGN PATENT DOCUMENTS

| 249,849 | 5/1970 | U.S.S.R. | 324/16 T |

Primary Examiner—Saxfield Chatmon, Jr.
Attorney, Agent, or Firm—Laurence J. Marhoefer; Lockwood D. Burton; Mitchell J. Halista

[57] ABSTRACT

A fuel injected engine timing instrument measures timing advance of fuel injection onset as referenced to a predetermined cylinder top-dead-center to provide an analog output signal proportional to fuel injection advance for the engine. This output signal is obtained by measuring the time required for an engine flywheel to move a predetermined distance which movement is sensed by a transducer responsive to timing indicia on the flywheel. An output signal from the transducer is applied to a gating circuit in combination with a signal derived from a transducer detecting the onset of fuel injection into the reference cylinder of the engine. The gating circuit is enabled by these two signals to control the duration of application of output signals from a fixed frequency oscillator to a counter. The output signal from the transducer sensing the movement of a flywheel is also used to control a second gating circuit arranged to apply the output signals from the oscillator to a second counter. The count signals from the first and second counters are compared by a ratio computing circuit to produce an analog output signal representative of the timing advance in degrees of the fuel injection onset before top-dead-center.

10 Claims, 1 Drawing Figure

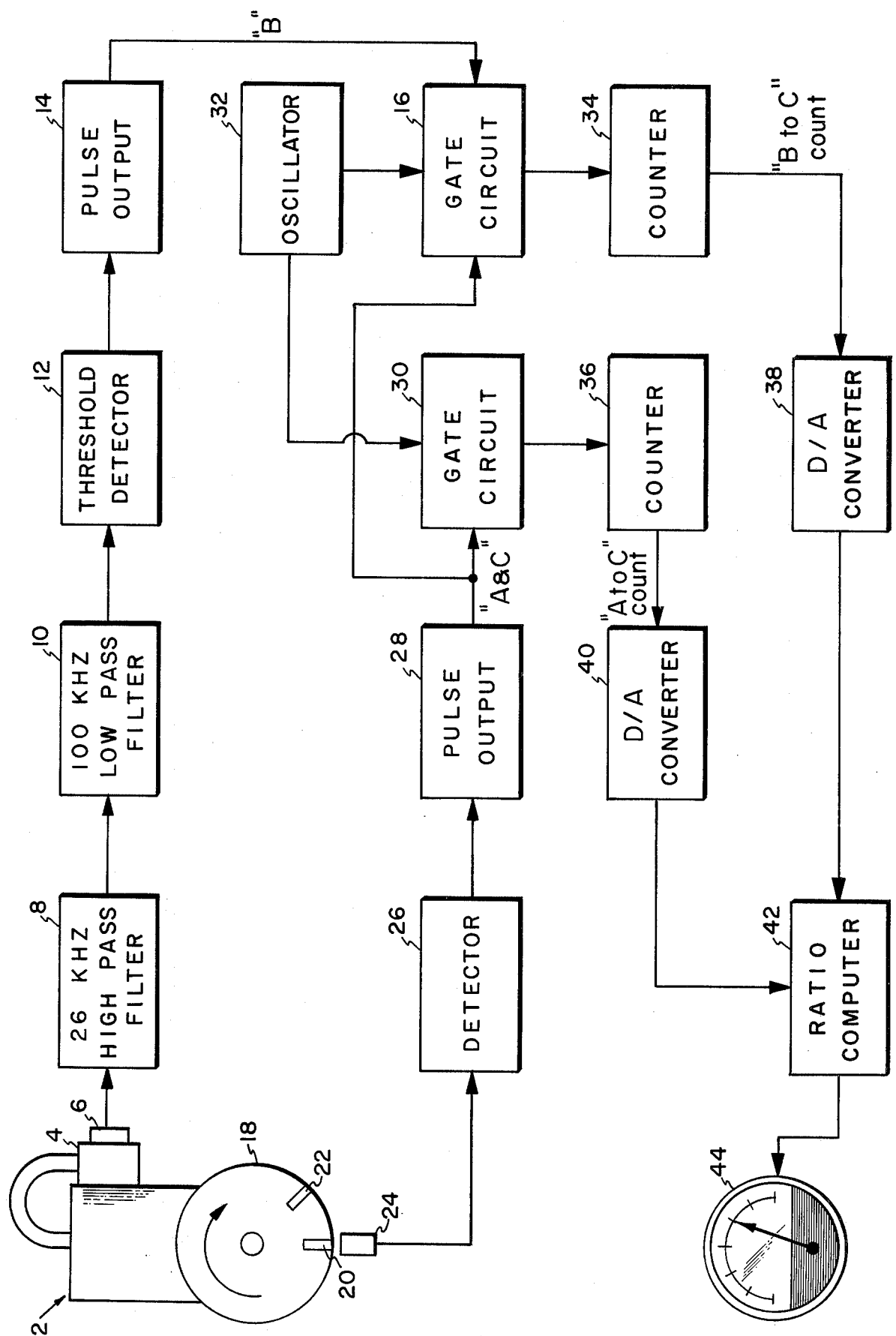

TIMING SYSTEM FOR MEASURING ANGLE OF ADVANCE OF FUEL INJECTION

This is a continaution of application Ser. No. 513,248 filed on Oct. 9, 1974 now abandoned.

BACKGROUND OD THE INVENTION

1. Field of the Invention

The present invention relates to engine timing instruments. More specifically, the present invention is directed to a timing instrument for use with a fuel injected engine.

2. Description of the Prior Art

The timing of the ignition spark of a conventional internal combustion engine is obtained by comparing the onset of the firing of the reference cylinder by a spark plug with the occurence of a timing mark located on the engine flywheel or other rotating part which revolves at crankshaft speed. A typical prior art method used with a spark ignition internal combustion engine is shown in U.S. Pat. No. 3,820,031. Such internal combustion engine timing instruments are inherently unsuited for use with a diesel engine inasmuch as the operation of the diesel engine does not provide a spark ignition signal as required to operate such prior art instruments.

SUMMARY OF THE INVENTION

Accordingly, it is an object of the present invention to provide an improved internal combustion engine timing instrument for diesel or other fuel injected engines.

In accomplishing this and other objects, there has been provided, in accordance with the present invention, a timing insturment for fuel injected engines using a first and a second signal is derived from the onset of the fuel injection into the engine, and the second signal is derived from a pair of discrete signals separated by the time requried for the flywheel of the engine to move a predetermined distance. The injection derived signal and the first of the flywheel derived signals are used to control the duration of application of signals from a fixed frequency oscillator to a counter. Concurrently, the first and second signals from the flywheel derived pulses are used to define the duration of application of output signals from the oscillator to a second counter. The count signals stored in the first and second counters are compared by a ratio computer to compute the ratio of the two count signals and to produce an output signal representative of the number of angular degrees that the injector signal is in advance of top-dead-center.

BRIEF DESCRIPTION OF THE DRAWING

A better understanding of the present invention may be had when the following detailed description is read in connection with the accompanying drawing in which the single Figure is a block diagram illustration of a timing instrument embodying the present invention.

DETAILED OF THE PREFERRED EMBODIMENT

DESCRIPTION DESCRIPTION

Referring to the single figure drawing in more detail, there is shown a block diagram of a timing instrument embodying the present invention for use with a diesel or other fuel injection type engine 2. A fuel injection pump 4 of the mechanical type is used to inject fuel into the cylinders of the engine. A transducer 6 is mounted on the fuel injectin pump to detect the onset of the fuel injection into the engine at a reference cylinder e.g., #1. The output signal from the transducer 6 is applied serially through a high pass filter 8 and a low pass filter 10 to retain only the frequency components falling in a predetermined pass band, e.g., 26kHz and 100kHz. The output signal from the low pass filter 10 is applied to a threshold detector 12 to produce an output signal upon the detection of a pulse from the low pass filter having a suitable predetermined amplitude. The output signal from the threshold detector 12 is amplified by a pulse output circuit 14 and is applied as a "B" signal to one input of a first circuit gate 16.

A flywheel 18 on the engine 2 is provided with a pair of fixed marks 20 and 22 spaced apart by a predetermined number of angular degrees, e.g., 60°. The marks 20 and 22 on the flywheel 18 are sensed by a second transducer 24 with the output signals from the second transducer 24 being applied to a detector circuit 26. The output signals from the detector 26 is amplified by a pulse output circuit 28 to produce pulse signals A and C which are applied as enabling signals to a second gate circuit 30 and as second input signals to the first gate circuit 16. A second input signal for the second gate circuit 30 is derived from a fixed frequency oscillator circuit 32 which is also used to supply a third input signal to the first gate circuit 16. The first and second gate circuits 16 and 30 may be any suitable circuits which are effective to allow passage of the signals from the oscillator 32 during a period of time as determined by the occurrence of two input signals thereto, such circuits being well-known in the art. For example, in the case of the first gate circuit 16, the detected output signal from the transducer 6 can be applied to the "set" input of a flip-flop while the "1" output of the flip-flop is applied to a two-input AND gate in combination with the output signal from the oscillator 32. Thus, the oscillator signals are passed through the AND gate only when the flip-flop has logical "1" output, i.e., a high level signal. The flip-flop is reset, i.e., returned to a logical "0" state to block the oscillator signals through the AND gate by the detection of the second timing mark on the flywheel. Since both marks 20 and 22 on the flywheel are being detected, the output signals A and C from the pulse output circuit 28 can first be applied to a two-bit counter (not shown) with only the second flywheel mark 22 producing a counter output signal to "reset" the flip-flop. Similarly, the second gate circuit 30 may include a flip-flop which is "set" by the first detected flywheel mark 20 and is "reset" by the second detected flywheel mark 22 with the logical "1" output of the flip-flop being applied as one input signal to a two-input AND gate while the output from the oscillator 32 supplies the other input signal to the AND gate. An output signal from the first gate circuit 16 is applied to a first counter 34 while the output signal from the second gate circuit 30 is applied to a second counter 36. An output signal from the first counter 34 representative of a count accumulated during the application of signals from the oscillator 32 to the counter 34 is applied to a first digital-to-analog converter 38. An accumulated count signal in the second counter 36 is applied to a second digital-to-analog converter 40. The output analog signals from the first and second D/A converters 38 and 40 are applied to an analog ratio computer circuit 42. The analog output signal from the analog computer circuit 42, representative of timing advance, is, in turn, applied to a timing indicating device such as a meter 44.

MODE OF OPERATION

In operation, the timing instrument of the present invention is arranged to produce an output signal which is representative of a number of angular degrees that the onset of fuel injection into the engine is in advance of top-dead-center of the reference cylinder of the engine. Specifically, the transducer 6 is any suitable vibration, or shock, sensitive transducer which is used to detect the mechanical vibration, or operation, of the fuel injection nozzle in the engine fuel injection system. As output signal from the transducer 6 representative of the operation of the fuel injection nozzle is filtered by the frequency filters 8 and 10 to leave only those typical vibration frequency components falling between 26kHz and 100kHz. This filtered signal is used to trigger a threshold detector 12 which is arranged to detect only a predetermined amplitude of the first peak of the filtered waveform from the transducer 6. The output of the threshold detector is shaped and amplified by a pulse output circuit 14 and is applied as a first input signal "B" to the first gate circuit 16.

Concurrently, a second transducer 24 is arranged to detect fixed timing marks 20 and 22 on a flywheel 18 of the engine 2. This transducer 24 and timing marks 20 and 22 may be any suitable combination of operative elements, such devices being known in the prior art. The timing marks 20 and 22 are separated on the flywheel 18 by a predetermined angular distance, e.g., 60°, with a second mark, i.e., mark 22, representing top-dead-center. An output signal from the transducer 24 is detected by a detector 26 and shaped and amplified by a pulse output circuit 28. The output signal from the pulse output circuit 28 consisting of a pair of pulses A and C representative of the occurrence of the timing marks 20 and 22, respectively, is applied as a first input signal to the second gate circuit 30 and as a second input signal to the first gate circuit 16. The first and second gate circuits 16 and 30 are used to control the application of output signals from the frequency oscillator 32 to a first counter 34 and a second counter 36, respectively. Thus, the signals applied from the oscillator 32 to the first counter 34 are counted by the counter 34 during a period of time between the application of the enabling signals to the gate circuit 16, i.e., the "B" signal from the pulse output circuit 14 and the "C" output signal from the pulse output circuit 28. Similarly, the signals from the oscillator 32 are counted by the second counter 36 during the period of time that separates the occurrence of the first output signal from the pulse output circuit 28 representative of the occurrence of the first timing mark 20 and the occurrence of the second output signal from the pulse output circuit 28 representative of the detection of the second timing mark 22.

The count signals stored in the counters 34 and 36 are applied to respective digital-to-analog converters 38 and 40, respectively, to be converted to analog output signals. These analog output signals are applied to a ratio computer circuit 42 which is arranged to compute the ratio of the "top-dead-center to injection period" to the "top-dead-center to known reference period" and to multiply this ratio by a signal representing the preselected number of degrees separating the timing marks on the flywheel 18, e.g., 60°. In other words, the ratio computer 42 computes the proportion where the "top-dead-center to reference period" to "60°" as "injector to top-dead-center period" is to "the unknown number of degrees representing timing advance." This analog ratio computer 42 may be any suitable device such as that manufactured by Analog Devices, Inc., of Norwood, Massachusetts and identified as "No. 434-B Divider." The output signal from the ratio computer 42 is an analog signal having an amplitude which is representative of the number of degrees advance of the fuel injection onset with respect to top-dead-center of the reference cylinder. This analog signal may be applied to any suitable output device, e.g., meter 44, to provide an indication of the timing advance. It should be noted that a signal delay may be added into the circuit from the transducer 6 to provide a compensation for any inherent delay in the high pressure fuel line leading to the injection nozzle whereby the measured number of degrees can be referenced to the opening of the pump delivery valve rather than the operation of the valve in the fuel injection nozzle. Alternatively, the transducer 6 may be mounted directly on the fuel injection nozzle to provide an even more precise monitoring of the occurrence of the fuel injection into the referenced cylinder. In order to operate the circuit of the present invention over several cycles, or revolutions, of the engine 2, reset signals for the counters and D/A converters used in the circuit can be generated from the transducer output signals with suitable delays to allow operation of the circuitry in computing the timing advance. These reset signals have been omitted from the single-figure drawing in order to simplify the presentation of the basic circuitry and the related discussion thereof.

Accordingly, it may be seen, that there has been provided, in accordance with the present invention a fuel injected engine timing instrument for measuring diesel engine timing.

The embodiments of the invention in which an exclusive property or privilege is claimed are defined as follows:

1. A fuel injection timing instrument for a fuel injected engine comprising
   first means for producing a first timing signal corresponding to the occurrence of fuel injection into an engine reference cylinder,
   second means for producing a second and a third timing pulse corresponding to the movement of a flywheel on the engine through a predetermined number of degrees between a first position and a second position, respectively, with said third pulse representing top-dead-center of the reference cylinder,
   third means for producing a succession of fixed time division signals,
   fourth means responsive to said second means and said third means for producing a first output signal having a characteristic representative of the time between the occurrence of said second and said third pulses representing the predetermined movement of the flywheel,
   fifth means responsive to said first, second and third means for producing a second output signal having a characteristic representative of the time between the occurrence of the onset of the fuel injection into the engine reference cylinder and said second timing pulse, and
   computing means for multiplying the ratio of said first and second output signals by a signal representative of the number of degrees on the flywheel between said first and second timing pulses to produce an output signal representative of a timing advance of the fuel injection onset before top-dead-center of the reference cylinder.

2. A fuel injection timing instrument as set forth in claim 1 wherein said first means includes a transducer arranged to monitor the mechanical operation of a fuel injection nozzle of the reference cylinder.

3. A fuel injection timing instrument as set forth in claim 1 wherein said fifth and fourth means each include a counter means, gate circuit for controlling the application of input signals into said counter means and a digital-to-analog converter means for converting a count stored in said counter means into an analog output signal and said third means includes a fixed frequency oscillator arranged to supply said input signal to said gate circuit, said fourth means having said gate means responsive to said second means and said fifth, means having said gate means responsive to said first means and said second means.

4. A fuel injection timing instrument as set forth in claim 3 wherein said computing means is an analog ratio computing means including an analog output indicating means arranged to provide a visual indication of said output signal from said computing means.

5. A fuel injected engine timing instrument comprising
first means for producing an output signal corresponding to the occurrence of the onset of fuel injection into an engine reference cylinder,
second means for providing output signals representative of the occurrence of a predetermined movement of a piston in the engine reference cylinder between a predetermined point before top-dead-center to top-dead-center of the reference cylinder, and
computing means responsive to said output signals from said first and second means for producing an output signal representative of the timing advance of the fuel injection onset before top-dead-center position of the piston during said predetermined movement of the piston in the reference cylinder.

6. A fuel injected engine timing instrument as set forth in claim 5 wherein said first means includes a transducer means arranged to monitor the mechanical operation of a fuel injection nozzle of the reference cylinder.

7. A fuel injected engine timing instrument as set forth in claim 5 wherein said computing means includes an analog input indicating means arranged to provide a visual indication of said output signal from said computing means.

8. A fuel injected engine timing instrument as set forth in claim 1 wherein said output signals from said second means include a first signal at said predetermined point and a second signal at said top-dead-center of said reference piston and said computing means includes means for producing an output signal having a characteristic representative of the time between the occurrence of the fuel injection onset and said top-dead-center of said reference piston.

9. A fuel injected engine timing instrument as set forth in claim 8 wherein said computing means includes a first time signal means responsive to said output signal from said first means and said second signal from said second means to produce a first time segment signal, a second time signal means responsive to said first and second signals from said second means to produce a second time segment signal and means for multiplying the ratio of said first and second time segment signals by a signal representative of the number of engine rotation degrees between said predetermined point and top-dead-center of the piston in said reference cylinder.

10. A fuel injected engine timing instrument as set forth in claim 9 wherein first time signal means includes a first gate means controlled by said output signal from said first means and said second signal from said second means to pass gate input signals therebetween and a first counter means connected to said gate means to count signals passed by said gate means and said second time signal means includes a second gate means controlled by said first and second signals from said second means to pass gate input signals therebetween and a second counter means connected to said second gate means to count signals passed by said second gate means and wherein said computing means includes a fixed frequency signal generating means connected to said first and second gate means to apply input signals thereto.

* * * * *